United States Patent [19]
Daum et al.

[11] Patent Number: 5,161,817
[45] Date of Patent: Nov. 10, 1992

[54] FLUID-OPERATED LEVELING VALVE SYSTEMS

[75] Inventors: James W. Daum; Tariq Latif, both of Downey; Paul B. O'Reilly, Cerritos, all of Calif.

[73] Assignee: IMO Industries Inc., Lawrenceville, N.J.

[21] Appl. No.: 598,032

[22] Filed: Oct. 16, 1990

[51] Int. Cl.⁵ .................................... B60G 17/056
[52] U.S. Cl. ............................ 280/714; 267/64.16; 267/64.28; 137/625.21
[58] Field of Search ............ 267/64.16, 64.28; 137/625.21; 280/714, DIG. 1, 6.12

[56] References Cited

U.S. PATENT DOCUMENTS

| | | | |
|---|---|---|---|
| 2,042,186 | 5/1936 | Peterson | 137/625.21 |
| 2,790,650 | 4/1957 | Boschi | 280/711 |
| 2,905,430 | 6/1959 | Deist | 251/54 |
| 2,910,305 | 10/1959 | Marette et al. | 280/6.1 |
| 2,947,322 | 8/1960 | Christensen | 137/636.1 |
| 2,947,532 | 8/1960 | Christensen | 267/64.16 |
| 2,948,549 | 8/1960 | Schultz | 280/6.1 |
| 2,970,614 | 2/1961 | Christensen | 137/627.5 |
| 3,006,657 | 10/1961 | Augustin | 280/6.1 |
| 3,014,499 | 12/1961 | Barksdale | 137/625.23 |
| 3,099,461 | 7/1963 | Stelzer | 280/DIG. 1 X |
| 3,104,114 | 9/1963 | Vogel | 280/6.1 |
| 3,214,185 | 10/1965 | Mason et al. | 280/6.1 |
| 3,276,476 | 10/1966 | Jackson | 137/627.5 |
| 3,796,232 | 3/1974 | Dalton | 137/625.21 |
| 3,831,968 | 8/1974 | Shaffer | 280/714 |
| 3,933,368 | 1/1976 | Kellett | 280/714 |
| 4,076,275 | 2/1978 | Hiruma | 280/707 |
| 4,377,299 | 3/1983 | Fujii | 280/708 |
| 4,471,805 | 9/1984 | Solie et al. | 137/625.21 X |
| 4,488,576 | 12/1984 | Skelly | 137/625.21 |
| 4,641,643 | 2/1987 | Morrisroe, Jr. | 280/840 |
| 4,823,550 | 4/1989 | Decker | 137/625.26 X |
| 4,871,189 | 10/1989 | Van Breemen | 280/711 |
| 5,014,748 | 5/1991 | Nogami et al. | 137/625.21 X |

*Primary Examiner*—Robert J. Oberleitner
*Assistant Examiner*—Josie A. Ballato
*Attorney, Agent, or Firm*—Benoit Law Corporation

[57] ABSTRACT

A fluid suspension system has a valve including first and second valve parts coupled to a supporting structure and to a supported structure, respectively, and movable relative to each other in response to movements of the supporting structure and the supported structure relative to each other. One of these first and second valve parts has a port connected to a fluid spring of the suspension system, and the other of these first and second valve parts includes a fluid passage having an aperture at that port for a supply of fluid through that port to the fluid spring in a first relative position of these first and second valve parts. A fluid outlet in that other valve part is spaced from the port in a first relative position of the first and second valve parts, and communicates with that port for a removal of fluid from the fluid spring in a second relative position of the first and second valve parts. Reaction of the suspension system to vibrations is reduced by providing a fluid-tight seal between the aperture and the port, and between the fluid outlet and that port for the extent of first and second separations proportional to an amplitude of the vibrations to be tolerated without reaction of the suspension system, and by extending the seal for the aperture by a distance in a direction away from the port also proportional to that amplitude.

46 Claims, 4 Drawing Sheets

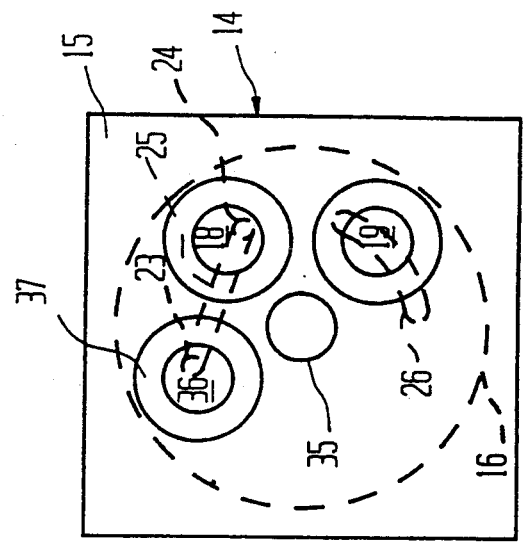
FIG. 5 SHAFT ROTATED FOR DUMP
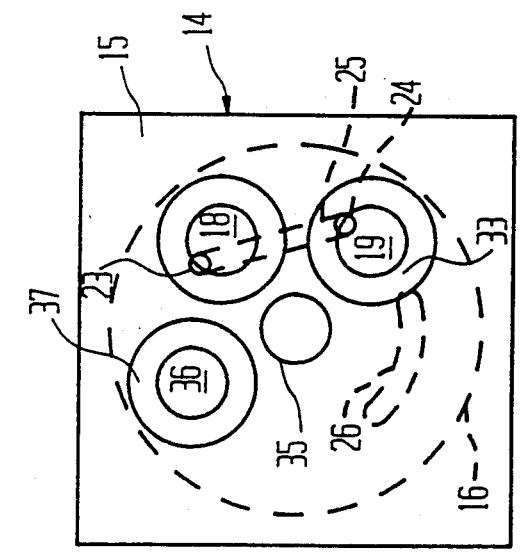
FIG. 4 SHAFT ROTATED FOR FILL
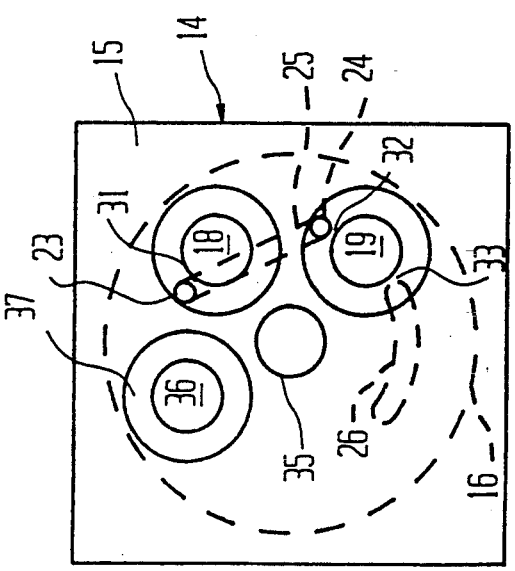
FIG. 3 SHAFT CENTERED

FLUID-OPERATED LEVELING VALVE SYSTEMS

BACKGROUND OF THE INVENTION

1. Field of the Invention

The subject invention relates to hydraulic or pneumatic suspension systems for vehicles and other structures, and to leveling height control and other hydraulic or pneumatic valves and systems.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of a pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

U.S. Pat. No. 2,790,650, by A. Boschi, issued Apr. 30, 1957, disclosed a pneumatic load-responsive spring suspension for vehicles, wherein a rotary leveling valve has a tangential notch in the moveable valve member for selectively connecting air springs to an air reservoir and to an air exhaust, respectively, at different angular positions of the cylindrical valve member.

U.S. Pat. No. 2,905,430 by H.H. Deist, issued Sep. 22, 1959, disclosed a control device for pneumatic vehicle suspension systems, wherein an adjustable time delay or damping component was included in an effort to prevent excessive operation of the valve, such as during normal axle movement due to road irregularities. Deist to this effect disclosed an annularly disposed body of damping liquid that had to be forced through an adjustable orifice before control forces could become effective through the leveling valve. Deist also disclosed arrangement of a coil spring between the valve actuating rod and central actuating member, in what he referred to as a "lost motion" connection serving to absorb high impact torques of momentary duration.

U.S. Pat. No. 2,910,305, by R.T. Marette et al, issued Oct. 27, 1959, disclosed provision of an auxiliary air cylinder for declutching the leveling valve so as to prevent road surface irregularities from affecting the operation of the pneumatic vehicle suspension system.

The problem has been further attacked in several to U.S. Pat. No. 2,947,322 issued Aug. 2, 1960, proposed the use of springs for absorbing quick movements imposed by rough roads, and fluid-flow restrictive adjustable orifices for dampening pneumatic suspension system reaction to rough roads and similar conditions. His other U.S. Pat. No. 2,947,532, issued also Aug. 2, 1960, also used the compressibility and flexibility of a coil spring and a needle valve for damping effects of rough roads and similar conditions. His further U.S. Pat. No. 2,970,614, issued Feb. 7, 1961, again provided a spring and adjustable damping means for countering rough roads and conditions.

U.S. Pat. 2,948,549, by F.O.E. Schultz, issued Aug. 9, 1960, disclosed a fluid suspension system for vehicles wherein air supply and air exhaust ports and a rotary valve body are smaller than corresponding air spring inlet and outlet ports, respectively, in order to avoid exchange of air between different air springs. According to Schultz minor undulations in the road surface will cause minor deflections of the air springs, and most of such deflections will be of such a small value that the valve will dwell in the area of its neutral position so that air is neither supplied to nor exhausted from the air springs.

By coincidence, L.S. Barksdale in that time frame applied for and obtained his U.S. Pat. No. 3,014,499, issued Dec. 26, 1961, disclosing his rotary valve concept having passages or galleries with corresponding ports in a rotary valve portion, adapted to register with ports of various patterns equipped with spring-biased tubular seals engaging the end wall of the rotary valve portion to provide fluid-tight seals.

U.S. Pat. No. 3,006,657, by D.A. Augustin, issued Oct. 31, 1961, combines a leveling valve with a pneumatic height control, whereby a vehicle may be operated at different height levels.

U.S. Pat. No. 3,104,114, by A.E. Vogel, issued Sep. 17, 1963, also disclosed a control system for vehicle suspension permitting increasing the ground clearance of the vehicle to negotiate rough terrain. Vogel also disclosed a rotary valve disk for providing selective air supply to and air exhaust from pneumatic suspension springs.

U.S. Pat. No. 3,214,185, by R.O. Mason et al, issued Oct. 26, 1965, disclosed a rotary leveling valve for a pneumatic vehicle suspension system. A height control may be effected from the driver's seat by remote action on a rockshaft extending transversely between a pair of leveling valves for actuation thereof.

U.S. Pat. No. 3,276,476, by G.W. Jackson, issued Oct. 4, 1966, disclosed a valve for controlling flow of pressurized fluid to air lift spring devices and the like, showing a vehicle in its preferred embodiment.

U.S. Pat. No. 3,831,968, by R.J. Shaffer, issued Aug. 27, 1974, disclosed use of rotary cam actuators for actuating distinct valve members for controlling pressure in a vehicle air spring.

U.S. Pat. No. 4,076,275, by M. Hiruma, issued Feb. 28, 1978, disclosed a vehicle hydropneumatic suspension system with vehicle body height control, with electric time delay circuit.

Even after the above mentioned Barksdale patent expired, the sealing principle therein disclosed for a rotary valve was not applied to pneumatic vehicle suspension control. Rather, U.S. Pat. No. 4,377,299, by M. Fujii, issued Mar. 22, 1983 to Nissan Motor Co., Ltd. proposed the use of a cam-actuated valve of the piston type, to provide an improved autoleveling device for a vehicle which in its own words, "eliminates all of the disadvantages of the prior art." One of these disadvantages according to that patent is that the prior art used springs acting upon ends of the control members. The system according to that patent uses no such springs acting upon ends of the control members, but utilized an orifice in the sliding piston valve body in an effort to dampen the response of the device to rapid movement of the wheels on rough roads.

U.S. Pat. No. 4,641,843, by Morrisroe, Jr., issued Feb. 10, 1987, disclosed the use of conventional front height and rear height control valves in a converted motor home leveling system.

U.S. Pat. No. 4,871,189, by C.A. Van Breemen, issued Oct. 3, 1989, also proposed the use of a conventional height control valve in conjunction with an orifice between the air spring and the air reservoir, forming a nonlinear air damped system providing a large damping effect in reaction to road bumps.

SUMMARY OF THE INVENTION

It is a general object of this invention to provide improved hydraulic or pneumatic suspension systems for vehicles and other structures.

It is a related object of this invention to provide improved leveling valves for hydraulic or pneumatic systems.

It is also an object of this invention to provide a fluid dumping system for hydraulic or pneumatic systems.

It is a related object of this invention to provide improved hydraulic or pneumatic height control valves for platforms or load beds.

Other objects will become apparent in the further course of this disclosure.

From a first aspect thereof, the invention resides in methods and apparatus for leveling a supported structure relative to a supporting structure with a fluid suspension system for a vehicle, that fluid suspension system located between that supporting structure and that supported structure. The invention according to this aspect resides in the improvement comprising in combination the steps of providing, or apparatus including a valve having first and second valve parts coupled to the supported structure and to the supporting structure, respectively, said first and second valve parts being on opposite sides of a plane and being movable relative to each other along said plane in response to movements of the supporting structure and the supported structure relative to each other, one of these first and second valve parts having spaced first and second ports connected to a fluid supply and a fluid spring, respectively, of the suspension system, the other of these first and second valve parts having a first aperture at the first port and a second aperture at the second port, and interconnecting the first and second apertures internally of the other valve part for passage of fluid between the first and second ports in a first relative position of these first and second valve parts, a fluid outlet in the other valve part spaced from the second port in the first relative position of the first and second valve parts, and communicating with the second port for a removal of fluid from the fluid spring in a second relative position of the first and second valve parts, the valve in a neutral position between the first and second relative positions having a first physical separation along said plane between the first aperture and the first port, a second physical separation along said plane between the second aperture and the second port, and a third physical separation along said plane between the fluid outlet and the second port, the first and second valve parts being detentlessly movable among said neutral position and said first and second positions in response to movements of said supporting structure and said supported structure relative to each other, and reducing reaction of the suspension system to vibrations due to road irregularities by providing fluid-tight seals between the first aperture and the first port, between the second aperture and the second port, and between the fluid outlet and the second port for the extent of the first, second and third separations, with each of these first, second and third separations being made proportional along said plane to an amplitude of the vibrations due to road irregularities to be tolerated without reaction of said suspension system to vibrations within said amplitude, and by extending one of the seals for the first aperture by a distance along said plane in a direction away from the first port also proportional to said amplitude and by also extending another of the seals for the second aperture by a distance along said plane in a direction away from the second port proportional to said amplitude.

From a related aspect thereof, the invention resides in the improvement comprising in combination the steps of providing, or apparatus including a valve having first and second valve parts coupled to the supported structure and to the supporting structure, respectively, said first and second valve parts being on opposite sides of a plane and being movable relative to each other along said plane in response to movements of the supporting structure and the supported structure relative to each other, one of these first and second valve parts having a port connected to the fluid spring of the suspension system, the other of these first and second valve parts including a fluid passage having an aperture at said port for a supply of fluid through that port to the fluid spring in a first relative position of these first and second valve parts, a fluid outlet in the other valve part spaced from the port in the first relative position of the first and second valve parts, and communicating with that port for a removal of fluid from the fluid spring in a second relative position of the first and second valve parts through the same port through which fluid is supplied to the fluid spring, the valve in a neutral position between its first and second relative positions having a first physical separation along said plane between the aperture and the port, and a second physical separation along said plane between the fluid outlet and that port, the first and second valve parts being detentlessly movable among the neutral position and the first and second positions in response to movements of the supporting structure and the supported structure relative to each other, and reducing reaction of the suspension system to vibrations by providing a fluid-tight seal between the aperture and the port, and between the fluid outlet and that port for the extent of the first and second separations, with each of the first and second separations being made proportional along said plane to an amplitude of the vibrations to be tolerated without reaction of the suspension system to vibrations within said amplitude, and by extending the seal for the aperture by a distance in a direction away from the port along said plane also proportional to said amplitude.

From a further aspect thereof, the invention resides in methods and apparatus for leveling a supported structure relative to a supporting structure with a fluid suspension system, having a fluid supply, a fluid spring, and a leveling valve having first and second valve parts movable relative to each other, and an actuating lever for angularly moving one of said first and second valve parts relative to the other of said first and second valve parts, said leveling valve and lever connected between the supporting structure and the supported structure. The invention according to this aspect resides in the improvement comprising in combination the steps of, or means for providing the leveling valve in said first valve part with a valve port connected to the fluid spring of the suspension system for selective inflation of the fluid spring from the fluid supply and for selective deflation of that fluid spring, providing a fluid outlet, deflating the fluid spring through that fluid outlet in response to an operator-controlled signal independently of said actuating lever, and blocking the fluid supply against discharge through the port in response to that signal independently of the actuating lever and independently of said one of the first and second valve parts.

The invention resides also in a method of leveling a supported structure relative to a supporting structure with a fluid suspension system, having a fluid spring between the supporting structure and the supported structure and having a leveling valve for that fluid spring. The invention according to this aspect resides more specifically in the improvement comprising in combination the steps of, providing said leveling valve with a lever for actuating said leveling valve, connecting said lever to one of said supporting structure and said supported structure, providing the leveling valve with a valve port connected to the fluid spring of the suspension system for selective inflation and deflation of the fluid spring, providing that leveling valve with a fluid outlet, providing an actuator for issuing a first operator-controlled signal, the actuator being independent of the leveling valve, deflating the fluid spring through the valve port and the fluid outlet in response to the first operator-controlled signal independently of the lever and independently of the actuator, blocking the fluid outlet in the leveling valve against discharge in response to a second operator-controlled signal independently of the lever and independently of the actuator, and selectively inflating the fluid spring through the valve port from a fluid supply in response to a third operator-controlled signal independently of the lever and independently of the actuator while blocking the fluid outlet in the leveling valve. The invention from a related aspect thereof resides in apparatus for leveling a supported structure relative to a supporting structure with a fluid suspension system, having a fluid spring between the supporting structure and the supported structure and having a leveling valve for that fluid spring, and resides more specifically in the improvement comprising in combination, a leveling valve actuator lever connected to said leveling valve, a valve port in the leveling valve connectable to the fluid spring of the suspension system for selective inflation and deflation of the fluid spring, a fluid outlet in the leveling valve, an actuator issuing a first operator-controlled signal, that actuator being independent of the leveling valve, leveling valve against discharge in response to a second operator-controlled inflating the fluid spring through the valve port from a fluid supply in response to a third operator-controlled signal independent of said actuator lever while blocking the fluid outlet in the leveling valve.

The invention resides also in apparatus for leveling a supported structure relative to a supporting structure with a fluid suspension system between supporting structure and the supported structure; such suspension system being non-reactive to vibrations up to a certain vibration amplitude. From one aspect thereof, this invention resides in the improvement comprising, in combination, a valve having first and second valve parts coupled to the supported structure and to the supporting structure, respectively, the first and second valve parts being on opposite sides of a plane for detentless movement relative to each other along said plane in response to movements of the supporting structure and said supported structure relative to each other, spaced first and second ports in one of these first and second valve parts connectable to a fluid supply and a fluid spring, respectively, of the suspension system, the other of these first and second valve parts having a first aperture at the first port and a second aperture at the second port, and a fluid passage between these first and second ports, a fluid outlet in the other valve part at the second port for a removal of fluid from the fluid spring, there being in a neutral position of said valve a first physical separation along said plane between the first aperture and the first port, a second physical separation along said plane between the second aperture and the second port, and a third physical separation along said plane between the fluid outlet and the second port, fluid-tight seals between the first aperture and the first port, between the second aperture and the second port, and between the fluid outlet and the second port for the extent of the first, second and third separations, with each of these first, second and third separations being made proportional to said vibration amplitude, an extension along said plane of one of the seals for the first aperture by a distance in a direction away from the first port also proportional to said amplitude, and an extension along said plane of another of the seals for the second aperture by a distance in a direction away from the second port proportional to said amplitude.

From another aspect thereof, that invention resides in a valve having first and second valve parts coupled to said supported structure and to said supporting structure, respectively, the first and second valve parts being on opposite sides of a plane for detentless movement relative to each other along said plane in response to movements of said supporting structure and said supported structure relative to each other, a port in one of these first and second valve parts connected to the fluid spring of the suspension system, the other of these first and second valve parts including a fluid passage having an aperture at the port for a supply of fluid through that port to the fluid spring in a first relative position of the first and second valve parts, a fluid outlet in the other valve part at the port, for a removal of fluid from the fluid spring through the same port through which fluid is supplied to that fluid spring, there being in a neutral position of the valve a first physical separation along said plane between the aperture and the port, and a second physical separation along said plane between the fluid outlet and that port, and a fluid-tight seal between the aperture and the port, and between the fluid outlet and the port for the extent of the first and second separations, with each of these first and second separations being made proportional along said plane to an amplitude of the vibrations to be tolerated without reaction of the suspension system to vibrations within said amplitude, and an extension along said plane of the seal for the aperture by a distance in a direction away from the port also proportional to that amplitude.

The invention resides also in apparatus for leveling a supported structure relative to a supporting structure with a fluid suspension system, having a fluid spring and having a leveling valve having first and second valve parts movable relative to each other, and an actuating lever for angularly moving one of said first and second valve parts relative to the other of said first and second valve parts, said leveling valve and lever connected between the supporting structure and the supported structure, and including a fluid supply connected through that leveling valve to the fluid spring, comprising in combination, a fluid outlet, means independent of said actuating lever for deflating the fluid spring through that fluid outlet in response to an operator-controlled signal, and means independent of the actuating lever and independent of said one of the first and second valve parts for blocking that fluid supply against discharge in response to that signal.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 3 is a section taken on the plane 3—3 in FIG. 1 and turned counterclockwise to correspond to the position of the valve in FIG. 2, showing the valve in neutral position;

FIG. 4 is a view similar to FIG. 3, but showing the valve rotor in a position for hydraulic or pneumatic fluid supply;

FIG. 5 is a view similar to FIG. 3, but showing the valve rotor in a fluid dump position.

DESCRIPTION OF PREFERRED EMBODIMENTS

Figure 2:
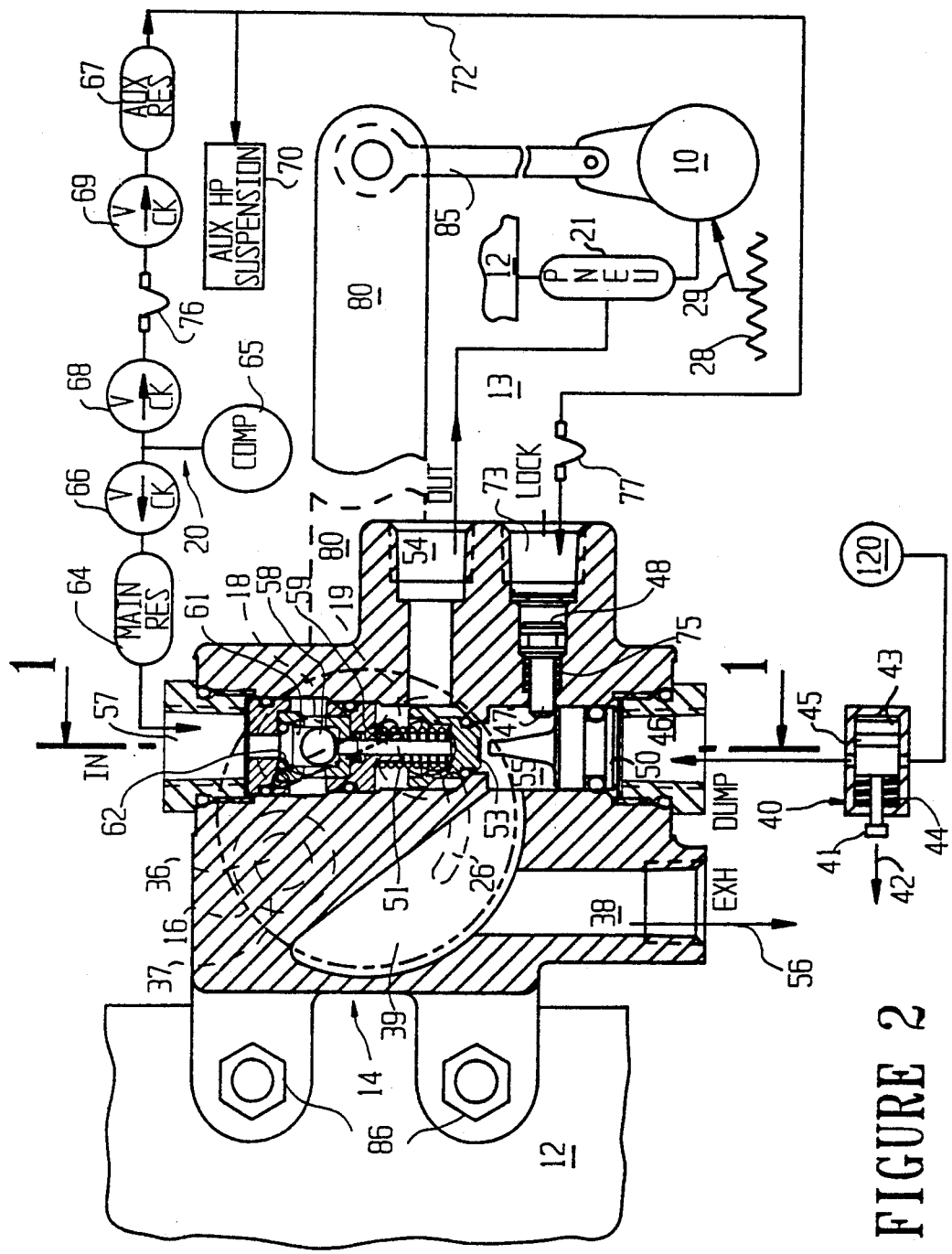
FIG. 2 is a section taken on the plane 2—2 in FIG. 1 and a diagram of accompanying fluid-operated equipment according to an embodiment of the invention.

The drawings illustrate methods and apparatus for leveling a supporting structure 10 relative to a supported structure 12 with a fluid suspension system 13 between that supporting structure and the supported structure. By way of example, the supporting structure 10 may be a vehicle axle or bearing and the supported structure 12 may be a vehicle frame or frame member, as in many of the above mentioned patents. Alternatively the supported structure may be a vehicle cab or body supported by the suspension system on the vehicle frame, or a platform supported by such fluid suspension system on a moveable or stationary supporting structure. In view of the broad utility of the subject invention, FIG. 2 shows the supporting structure 10 and the supported structure 12 only broadly, and the other figures omit showing of such conventional structures.

Figure 1:
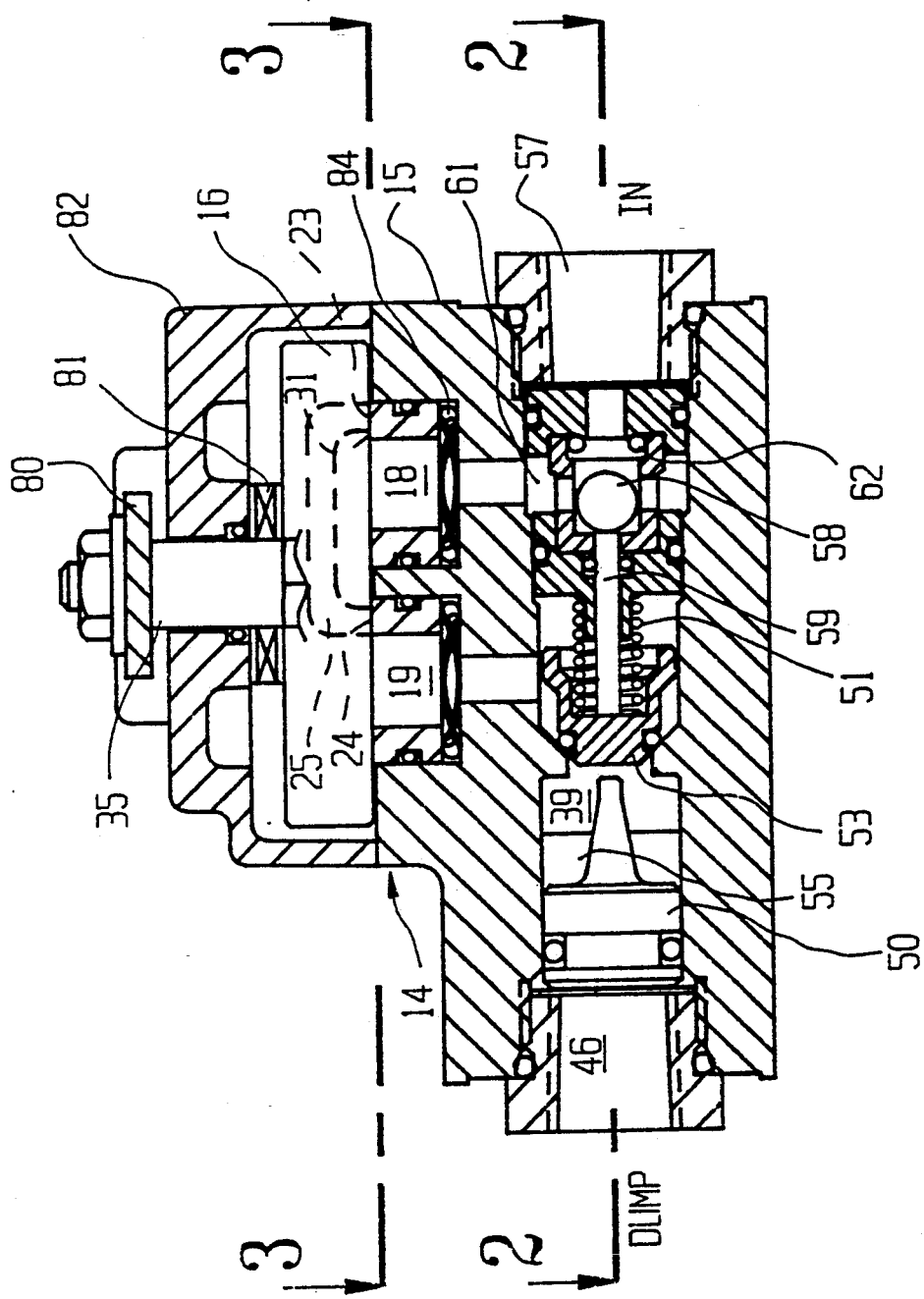
FIG. 1 is a section taken on the plane 1—1 in FIG. 2, of a fluid-operated leveling valve pursuant to a preferred embodiment of the invention.

The illustrated embodiment of the invention provides a valve 14 including first and second valve parts 15 and 16 coupled to the supported structure 12 and to the supporting structure 10, respectively. As seen in FIG. 1, these first and second valve parts 15 and 16 are opposite sides of the plane 3—3. That plane 3—3 is also the plane of the paper on which FIGS. 3 to 5 are drawn. These first and second valve parts 15 and 16 are movable relative to each other along the plane 3—3 in FIG. 1 or along the plane of the paper on which FIGS. 3 to 5 are drawn, in response to movements of that supporting structure and the supported structure relative to each other. By way of example, the second valve part is shown as a rotor 16 angularly movable relative to the first valve part 15 which is stationary relative to the supported structure 12.

One of the first and second valve parts, such as the relatively stationary valve base 15, is provided with spaced first and second ports 18 and 19 connected to a fluid supply 20 and a fluid spring 21, respectively, of the suspension system As seen, for instance, in FIG. 3, the other of the first and second valve parts, such as the rotor 16, is provided with a first aperture 23 at the first port 18 and with a second aperture 24 at the second port 19. These first and second apertures 23 and 24 are interconnected internally of that other valve part 16 for passage of fluid between said first and second ports 18 and 19 in a first relative position of said first and second valve parts, such as the relative position of the valve rotor 16 to the valve base 15 shown in FIG. 4. FIGS. 1 and 3 to 5 show a fluid passage 25 inside the rotor 16 and between the first and second apertures 23 and 24. FIG. 1 shows the fluid passage 25 in dotted lines, since it is located inside the rotor 16 and spaced inwardly from the rotor surface through which the apertures 23 and 24 extend. FIGS. 3 to 5 show the rotor 16 and all apertures and fluid passages therein also in dotted outline, since the section line 3-3 extends between the valve parts 15 and 16.

The illustrated embodiment provides a fluid outlet 26 in the other valve part 16 spaced from the second port 19 in the neutral position shown in FIG. 3 and in the first relative position of said first and second valve parts, shown in FIG. 4. That fluid outlet 26 communicates with the second port 19 for a removal of fluid from the fluid spring 21 in a second relative position of the first and second valve parts, such as the relative position of the valve rotor 16 to the valve base 15 shown in FIG. 5.

FIG. 3 shows the valve 14 in a neutral position between the first relative position shown in FIG. 4 and the second relative position of the first and second valve parts 15 and 16 shown in FIG. 5. In that neutral position there are a physical separation along the plane 3—3 in FIG. 1 or along the plane of the paper on which FIGS. 3 to 5 are drawn, between the first aperture 23 and the first port 18, a second physical separation along the plane 3—3 in FIG. 1 or along the plane of the paper on which FIGS. 3 to 5 are drawn, between the second aperture 24 and the second port 19, and a third physical separation along the plane 3—3 in FIG. 1 or along the plane of the paper on which FIGS. 3 to 5 are drawn, between the fluid outlet 26 and the second port 19, as shown in FIG. 3, for example. In this respect, "port" refers to the apertures through 18 and 19. Neither FIGS. 3 to 5, nor FIGS. 1 and 2 show any detents. Rather, the first and second valve parts 15 and 16 are detentlessly movable among the neutral position (FIG. 3) and the first and second positions (FIGS. 3 and 5) in response to movements of the supporting structure 10 and the supported structure 12 relative to each other in the fluid suspension system 13 for vehicles, such as shown in FIG. 2.

FIG. 2 shows an undulated line 28 with an arrow 29 to illustrate the effect of rough roads, earth tremors or other irregularities on the supporting structure 10. A similar arrow (not shown) may extend to the supported structure 12 which may also be subjected to vibration-causing events in practice, such as load vibrations or reactions to vibrations of the supporting structure.

The illustrated embodiment of the invention reduces reaction of the suspension system to vibrations, such as caused by road irregularities or tremors, by providing fluid-tight seals at 31, 32 and 33 between the first aperture 23 and the first port 18, between the second aperture 24 and the second port, and between the fluid outlet 26 and that second port 19 for the extent of the first, second and third separations. As seen in FIG. 3, the seals 32 and 33 may be provided in the same sealing element. Each of these above mentioned first, second and third separations is made proportional along the plane 3—3 in FIG. 1 or along the plane of the paper on which FIGS. 3 to 5 are drawn, to an amplitude of the vibrations 28 to be tolerated without activation of the suspension system; that is, without reaction of the suspension system to vibrations 28 within that amplitude. The embodiment of the invention as seen in FIGS. 3 to 5 extends the seal for the first aperture 23 along the plane 3—3 in FIG. 1 or along the plane of the paper on which FIGS. 3 to 5 are drawn, by a distance in a direction away from the first port 18 also proportional to the amplitude just mentioned and also extends the seals at 32 and 33 for the second aperture 24 along the plane 3—3 in FIG. 1 or along the plane of the paper on which FIGS. 3 to 5 are drawn, by a distance in a direction away from the second port 19 proportional to that amplitude.

Principles of the subject invention are also applicable to a valve which provides one of its first and second valve parts with a port connected to a fluid spring 21 of a suspension system, and which provides the other of the first and second valve parts with a fluid passage having an aperture at that port for a supply of fluid through that port to that fluid spring in a first relative position of the first and second valve parts. In this respect, and by way of example, the valve base 15 may be provided with a port 19 connected to the fluid spring 21, and the valve rotor 16 may be provided with a fluid passage having an aperture 24 at that port 19. The fluid passage may be similar in that case to the fluid passage 25. However, under this scope of the invention, the fluid passage need not lead to another aperture 23 and port 18. Rather the fluid passage 25 may then lead to a fluid inlet in the rotor 16. Reference may in this respect be had to the above mentioned Schultz Patent 2,948,549 which is herewith incorporated by reference herein, and which shows an axial bore 52 in the shaft of its rotatable member. In that Schultz patent, that bore 52 is an air exhaust. In the presently described embodiment of the invention such an axial shaft bore would just be the opposite.

In particular, in the presently described embodiment of the invention, the fluid passage 25 is connected to an axial bore (not shown) in the rotor shaft 35 and an upper end of that axial bore is coupled to a source 20 of fluid, such as through a conventional fluid coupling (not shown) for a supply of fluid through the fluid passage 25, aperture 24 and port 19 to the fluid spring 21 in the kind of first relative position of the first and second valve parts 15 and 16 shown in FIG. 4.

In that case, too, a fluid outlet 26 provided in the other valve part 16 is spaced from the port in the first relative position of the first and second valve parts 15 and 16 in the neutral position shown in FIG. 3 and in the first relative position shown in FIG. 4. However, that outlet 26 again communicates with that port 19 for a removal of fluid from the fluid spring 21 in the second relative position of these first and second valve parts shown in FIG. 5. Fluid is thus removed through the same port 19 through which fluid is supplied to that fluid spring 21.

In that case too, the valve is provided in a neutral position between the above mentioned first and second relative positions with a first physical separation along the plane 3—3 in FIG. 1 or along the plane of the paper on which FIGS. 3 to 5 are drawn, between the aperture 24 and the port 19, and with a second physical separation along the plane 3—3 in FIG. 1 or along the plane of the paper on which FIGS. 3 to 5 are drawn, between the fluid outlet 26 and that port 19. Moreover reaction of the suspension system to vibrations is reduced by providing a fluid-tight seal between the aperture 24 and the port 19, and between the fluid outlet 26 and that port 19 for the extent of said first and second separations as seen at 32 and 33 in FIG. 3. Each of these first and second separations is made proportional along the plane 3—in FIG. 1 or along the plane of the paper on which FIGS. 3 to 5 are drawn, to an amplitude of vibrations to be tolerated without activation of said suspension system, and the seal for said aperture 24 is extended by a distance in a direction away from the port 19 along the plane 3—in FIG. 1 or along the plane of the paper on which FIGS. 3 to 5 are drawn, also proportional to that amplitude.

As seen in FIGS. 3 to 5, each aperture 23 and 24 is made smaller than its corresponding port 18 and 19, respectively, for a favorable antivibration deadband.

As shown in FIGS. 3 to 5, according to a preferred embodiment of the invention one valve part, such as the valve base 15, is provided with a blind third port 36. As shown in FIG. 5, the first aperture 23 is moved to that blind third port upon movement of the second aperture 24 to the first port 18 by movement of the other valve part or rotor 16 further away from the first relative position shown in FIG. 3 than an initial range of the second relative position of the first and second valve parts 15 and 16. For example, if the valve rotor 16 moves to and beyond its second position relative to the valve base 15 shown in FIG. 5, the fluid source 20 is protected against exhaustion by the blind port 36 (closed port). The illustrated blind port 36 has a seal 37 corresponding in width to the seal 31 of the fluid inlet port 18. According to FIG. 5, these seals 31 and 37 cooperate in sealing both ends of the fluid passage 25 against escape of fluid at apertures 24 and 23, respectively. Even if sudden jolts and the like move the valve rotor 16 further counter-clockwise as seen in FIG. 5, fluid cannot escape, since the fluid passage 25 then connects the fluid inlet port 18 through apertures 24 and 23 to the blind port 36 which is sealed off by the seal 37. The fluid spring system can thus resume normal operation when the valve rotor 16 is moved clockwise to the first relative position shown in FIG. 4 for eventual restoration of its neutral relative position shown in FIG. 3.

An embodiment of the subject invention provides a further fluid outlet 38 at the valve 14 and deflates the fluid spring 21 through that further outlet in response to a signal from an operator. Incidentally, a bore or larger passage 39 in the valve base 15 may lead from the fluid outlet 26 in the valve rotor 16 to the fluid outlet 38.

By way of example, a driver of a vehicle equipped with a fluid suspension system, or another operator, may need or want to deflate the fluid springs at the end of an operation. The system may be equipped with a dump switch or actuator 40 for this purpose, which may be of a pneumatic or hydraulic type as shown by way of example in FIG. 2. By pulling a knob 41 in the direction of an arrow 42, an operator can move a cylinder 43 against the bias of a spring 44 until a transverse channel 45 in that cylinder permits the flow of fluid from a source 120, which may be combined with the source 20 or reservoir 64, to an auxiliary or dump port 46 in the valve base 15. Other pneumatic, hydraulic, electropneumatic, electrohydraulic, electromechanical, or mechanical switching devices or apparatus may, of course, be used for that purpose.

Disregarding for the moment the presence of a locking or blocking piston 48 to be more fully described below, fluid pressure applied via dump actuator 40 to the dump port 46 moves an auxiliary or dump piston 50 against the bias of a spring 51 shown in FIG. 2. In this manner the dump piston 50 unseats a normally closed valve 53 so that fluid can escape from the fluid spring 21 through port 54, unseated valve 53, passage 55 connected to the passage 39 in the valve base 15, and through outlet port 38. If the operating fluid is air, fluid dumped from the fluid spring 21 is typically exhausted to atmosphere.

Alternatively, if the operating fluid is a gas other than air or is oil or another hydraulic fluid, the arrow 56 may be taken as a fluid line for returning operating fluid from the valve outlet 38 to the fluid source 20 for recompression. Fluid may thus be recompressed whether it is dumped from the air springs or whether it is released from the air springs during normal operation of the suspension system, such as by movement of the rotor 16 to the relative position shown in FIG. 5, as more fully described below.

Fluid pressure applied from the source 20 through the valve input port 57 keeps a ball 58 against the stem 59 of the closed valve, whereby fluid may flow through the passages 61 to the port 18 seen in FIGS. 3 to 5. The normally closed valve 53 blocks fluid discharge through the further outlet 38 during operation of the suspension system. That valve 53 may be called "auxiliary valve" in distinction to the valve 14.

On the other hand, if the dump fluid switch 40 is actuated and the dump fluid piston 50 moves the exhaust valve 53 to an open position against the bias of the spring 51, and the fluid spring 21 is deflated through the further outlet 38 upon a cessation of operation of the suspension system, the correspondingly moving valve stem 59 moves the ball 58 against its seat 62 thereby blocking the fluid supply 20 against discharge through the ports 18 and 19 during deflation of the fluid spring through the further outlet 38. The illustrated embodiment of the invention thus prevents loss of pressure at the fluid port 57 from the fluid source 20 or reservoir 64. The expression "auxiliary valve" may be used for the valve formed by the ball 58 and its seat 62.

The reservoir 64 may be charged with fluid by a compressor 65 through a check valve 66. The reservoir 64 may be the main reservoir, if there is also an auxiliary reservoir 67. That auxiliary reservoir may have its own compressor, or may be charged with fluid from the compressor through check valves 68 and 69.

By way of example, the main reservoir 64 may belong to the air spring system of a tractor, while the auxiliary reservoir may belong to a similar air spring system 70 of a trailer having its own fluid valve or valves similar to valve or valves 14 and its own fluid springs similar to fluid spring 21.

Under certain circumstances, problems can arise if fluid is dumped from a fluid suspension system either accidentally or inappropriately. For instance, if the driver actuates the dump switch 40 while the vehicle is in operation on the road, a dumping of fluid from the fluid springs 21 would damage the suspension, since the metal springs in a fluid suspension system are not strong enough to carry the load during operation by themselves.

For this and similar reasons, a safeguard is necessary against detrimental dumping. Accordingly, the illustrated embodiment of the invention provides a latching mechanism at 48 to prevent accidental and inappropriate dumpings. By way of example, fluid pressure from the auxiliary reservoir 67 or other fluid supply is used to prevent accidental or inappropriate dumping.

The illustrated embodiment of the invention provides for blocking of the fluid supply 20 against discharge through the ports 18, 19 or 38 in response to the signal provided by actuation of the fluid dump valve or switch 40. For instance, if there is an auxiliary reservoir 67 or another auxiliary fluid supply, then there may be blocking or locking of the deflation of the fluid spring 21 through the port 19 or through the further outlet 38 until a cessation of fluid pressure in or from that auxiliary fluid supply 67. Of course, such a locking blocks fluid dumping, but does not affect normal operation of the fluid suspension system which includes some fluid discharge through the outlet shown at 26 in FIG. 5, for instance.

According to the specific example shown in FIG. 2, fluid pressure is applied from the auxiliary reservoir 67 such as by a line 72, through an additional port 73 in the valve base 15 to the locking piston 48 which places a locking pin 47 into the path of the fluid dump control piston 50. Accordingly, no dumping of fluid can take place as long as fluid pressure is present at the locking piston 48.

If a driver is unsuccessful in dumping fluid after actuation of the switch 40, he or she will realize that pressure in or from the auxiliary reservoir 67 has to cease before dumping can take place. In practice, this may mean that a fluid dump switch similar to the dump switch 40 has to be operated in or for the auxiliary suspension system 70 or that the trailer or other auxiliary system has to be shut down or disconnected, such as at hose couplings 76 and 77 between tractor and trailer. Once the hose couplings 76 and 77 have been disconnected or the pressure in or from the auxiliary reservoir 67 has otherwise ceased at the locking piston 48, the bias spring 75 is able to move that piston and thereby the locking pin 47 out of the way of the fluid dumping piston 50. The pressure applied to that piston 50 by actuation of the dump switch 40 in the direction of arrow 42 will then permit that deblocked piston to open the valve 53 for a dumping of fluid from the fluid spring 21 as described above.

There are, of course, several ways and means for implementing the subject matter of the invention in the form of methods and apparatus for leveling a supported structure relative to a supporting structure with a fluid suspension system between that supporting structure and that supported structure, wherein that suspension system is non-reactive to vibrations up to a certain vibration amplitude.

For instance, if the invention is practiced on a vehicle or on a platform, the customary sensing or actuating lever may be employed for angularly moving one valve part, such as the rotor 16, relative to the other valve part, such as the valve base 15. Such lever 80 may be directly attached to the rotor shaft 35, such as in the manner shown in .FIG. 1, for angular motion of the rotor 16, such as in the manner shown in FIGS. 3 to 5. The rotor 16 and its shaft 35 and thrust bearing 81 may be contained in a valve housing 82 fastened on top of the valve base 15 by bolts.

The seals at 31, 32, 33 and 37 may be pressure seals pressed against the rotor 16 by spring washers 84. These seals are located, respectively, at the fluid input port 18, fluid spring port 19, and blind port 36. Such seals prevent fluid from escaping and also prevent reaction of the fluid suspension system to vibrations imposed by rough road conditions or other irregularities.

The fluid springs of the system may be pneumatic bellows or other types of air springs or may be hydraulic actuators. As shown in FIG. 2 at 21, the fluid springs are mechanically connected between structures 12 and 10 or otherwise so as to hydraulically, pneumatically or hydropneumatically suspend one structure relative to the other. In the case of a platform, what has herein been termed a "supporting structure" (10) may rather be a structure supported by a concrete slab or other platform support corresponding to what has herein been termed a "supported structure" (12).

The valve sensing or actuating lever 80 may be connected to the vehicle axle or axle bearing, to a platform or other relatively moveable structure by a link .85 transmitting relative motions between structures 10 and 12 to the lever 80 and thereby to the valve rotor 16. The valve base may be attached to the structure 12 by bolts 86, for instance.

The lever 80 thus moves the valve rotor 16 to the relative position shown in FIG. 4 when operation of the fluid suspension system is initiated or when the fluid springs 21 otherwise need inflating. In that case, fluid can flow from the reservoir 64, charged by compressor 65, or from a fluid source 20 in general, to fluid springs 21 through port 57, chambers 61, valve port 18 connected thereto, aperture 23 communicating therewith, fluid passage 25, aperture 24, valve port 19 communicating therewith, passage and port 54 communicating therewith and with the air springs 21.

As the fluid suspension of the supported structure progresses by inflation of fluid springs 21, the lever 80 moves the valve rotor 16 to its neutral position shown in FIG. 3. In that case the structure 12, such as in the case of a vehicle load bed, or the structure 10, such as in the case of a vehicle cab or a platform, is well suspended and the system is protected against reaction to vibrations 28 as disclosed above.

However, the lever 80 moves the valve rotor 16 back to a position of the type shown in FIG. 4, if more fluid is needed for reinflating fluid springs 21 and for restoring the proper spacing between supporting and supported structures and thereby the neutral condition illustrated in FIG. 3.

Conversely, the lever 80 moves the rotor 16 to a fluid exhaust condition of the type shown in FIG. 5, if the linkage 85 or another sensor signals that there is too much fluid in the springs 21 served by valve 14. In this manner, the neutral condition shown in FIG. 3 may be restored as desired or necessary.

Apart from, or in addition to, this operation, fluid dumping or shutdown of the system may be effected as disclosed above using, for instance, a fluid dumping valve 40. Although disclosed together with the leveling and antivibration features according to an aspect of the subject invention, the fluid dumping features herein disclosed may be used without such leveling and antivibration features according to another aspect of the invention.

According to such further aspect, the invention resides in methods and apparatus for leveling a supported structure 10 or 12 relative to a supporting structure 12 or 10 with a fluid suspension system having a fluid spring 21 and having a leveling valve 14 between the supporting structure and the supported structure, and including a fluid supply 20 connected through such leveling valve to the fluid spring 21. This aspect of the invention comprises in combination the provision of a fluid outlet, such as the fluid outlet 38, the step of or means 40, 50, 53 for deflating the fluid spring 21 through such fluid outlet in response to a signal from an operator, and the step of or means 48 and/or 58 for blocking the fluid supply against discharge in response to the signal generated, for instance at 41. By way of example, this method may provide the leveling valve with a valve port 19 connected to the fluid spring of said suspension system for selective inflation and deflation of that fluid spring 21. The above mentioned fluid outlet 38 may be provided in the leveling valve 14 as shown in FIG. 2, but alternatively may be provided in a separate structure under the currently discussed aspect of the invention. The phrase "signal from an operator" may be considered to denote an operator-controlled signal.

According to the currently discussed aspect of the invention, the above mentioned blocking of the fluid supply 20 against discharge may, but need not be, effected in the leveling valve 14. For example, the fluid outlet 38 and at least part of the means 50 and 53 for deflating the fluid spring 21 in response to a signal from an operator and the means 58 and 59 for blocking the fluid supply 20 are in the leveling valve 14.

On the other hand, an auxiliary valve 53 for blocking complete fluid discharge through the fluid outlet 38 during operation of said suspension system, an actuator 50 for that auxiliary valve, whereby the fluid spring 21 is deflated through the fluid outlet 38 upon a cessation of operation of the suspension system, and a further auxiliary valve 48 blocking the fluid supply 20 against discharge through the fluid outlet during deflation of the fluid spring through that outlet 38, may or may not be incorporated in the leveling valve 14. As seen in FIG. 2 the deflating means 40, 50, 53, and the blocking means 48 and 58 are independent, and operate independently, of the valve actuating lever 80, and these blocking means are also independent of the one of the first and second valve parts; that is, independent of the valve part 16 in FIGS. 1 and 2.

Figure 6:
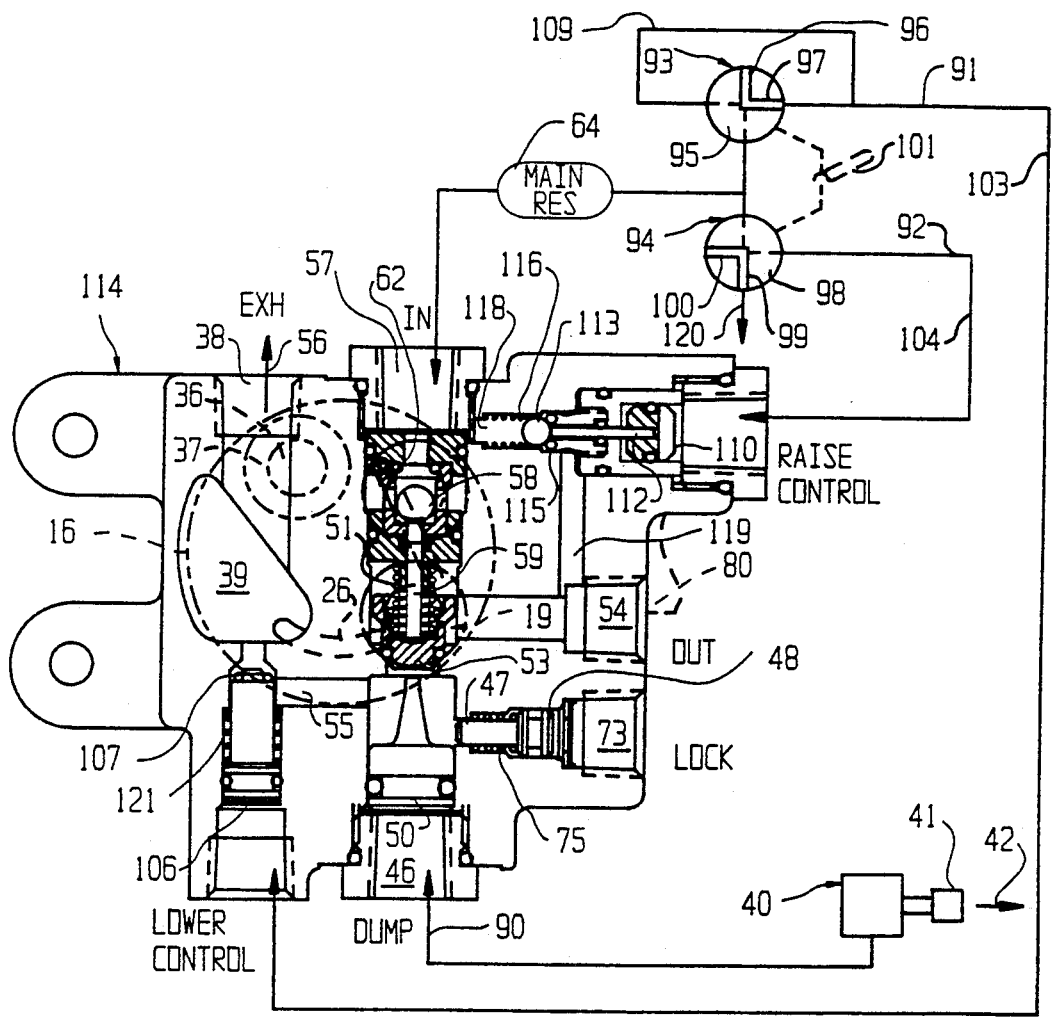
FIG. 6 is a section similar to FIG. 2, but showing a fluid-operated leveling valve system according to another embodiment of the invention.

The same applies to the embodiment shown in FIG. 6. In this respect, FIG. 6 shows another method and apparatus for leveling a supported structure relative to a supporting structure with a fluid suspension system, having a fluid spring between that supporting structure and said supported structure and having a leveling valve for that fluid spring. This method and apparatus may be combined with the methods and apparatus already disclosed or, according to another aspect of the invention, may be used independently or with other leveling valves. Nevertheless, like reference numerals are used in FIG. 6 for those parts or details which may be the same as in other figures using such reference numerals or which may be equivalents thereof.

The leveling valve 114 shown in FIG. 6 is provided with a valve port 54 connected to a fluid spring, such as the fluid spring 21 of the suspension system for selective inflation and deflation of that fluid spring. The above mentioned actuator 40 is also provided in the embodiment of FIG. 6 for issuing a first operator-controlled signal 90. As seen in FIGS. 2 and 6 that actuator 40 is independent of the leveling valve 14 or 114. The leveling valve 114 is also provided with a fluid outlet 38, and the fluid spring is deflated through the valve port 54 and that fluid outlet in response to a that first signal 90 from the actuator 40. As seen in FIG. 2 the deflating means 40, 50, 53, and the blocking means 48 and 58 are independent, and operate independently, of the valve actuating lever 80. That first signal may again be produced by actuating the switch or actuator 40, such as by pulling the knob 41 in the direction of arrow 42, shown in FIG. 2. A bistable switch can be used so that the normally closed valve 53 is unseated until the knob 41 is pushed back. Other pneumatic, hydraulic, electropneumatic, electrohydraulic, electromechanical, or mechanical switching devices or apparatus may, of course, be used for that purpose, and/or for providing the second and third signals mentioned below.

The locking or blocking piston 48, with locking pin 47 may be provided and operated as disclosed above, or may be omitted from the apparatus of FIG. 6, if there is no auxiliary fluid supply. Accordingly, the presence of the locking or blocking piston 48 and locking pin 47 is optional in the apparatus of FIG. 6.

Fluid pressure applied via dump actuator 40 to the dump port 46, or otherwise as or in response to the first signal 90, moves an auxiliary or dump piston 50 against the bias of a spring 51 shown also in FIG. 6. In this manner, the dump piston 50 unseats a normally closed valve 53 so that fluid can escape from the fluid spring 21 through port 54, unseated valve 53, passage 55 connected to the passage 39 in the valve base 15, and through outlet port 38. As before, fluid dumped from the fluid spring 21 may be exhausted to atmosphere or recycled to the fluid source 20 or reservoir 64.

The platform or other structure 12 supported by the spring 21 may thus be lowered until it has reached the level then desired. At that point the fluid outlet 38 may be blocked in the leveling valve 114 against discharge in response to a second signal 91 from the operator. The platform or other supported structure 12 may thus be stopped at the desired level.

On the other hand, the level of the platform or other structure 12 may be raised by selectively inflating the fluid spring 21 through the valve port 54 from a fluid supply 64 in response to a third signal 92 from the operator while blocking the fluid outlet 38 in the leveling valve 114. If that fluid supply has other functions, such as a leveling function of the type described above in connection with FIGS. 1 to 5, then that fluid supply 64 needs to be blocked against discharge through the valve port 19 or through ports 18 and 19. According to the embodiment of FIG. 6, that may be done in the same manner as in the embodiment of FIGS. 1 and 2, namely by having the stem 59 of the valve 53 press the ball 58 against its seat 62 when pressure is applied to the dumping piston 50, such as by actuation of the dump switch 40 providing the first signal 90 shown in FIG. 6 as described above.

If desired, a dumping action may again be blocked if there is an auxiliary fluid supply, such as shown at 67 in FIG. 2. A deflation of the fluid spring 21 through the fluid outlet 38 may thus be blocked until a cessation of fluid pressure in the auxiliary fluid supply.

As in the case of signal 90, there are various pneumatic, hydraulic, electropneumatic, electrohydraulic, electromechanical, or mechanical ways and means for providing the second and third signals 91 and 92 and for selectively blocking the fluid outlet 38 and circumventing the blocked fluid inlet in response thereto. By way of example, FIG. 6 shows a pair of ganged valves 93 and 94 connected to the fluid supply 20 or reservoir 64 for providing the first and second signals 91 and 92, respectively.

The valve 93 has a rotary core 95 provided with an angular channel having legs 96 and 97. Similarly, the valve 94 has a rotary core 98 provided with an angular channel having legs 99 and 100. Individual actuators could be used for the valves 93 and 94. However, the valve cores 95 and 98 are shown ganged for common rotation by a lever or other actuator 101. Dotted lines in the cores 95 and 98 indicate alternative positions for the channel legs 96, 97 and 99, 100 as these cores are angularly moved by quarter turns.

In the solidly illustrated position of the cores, both lines 103 and 104 are in effect disconnected from the fluid supply 64 and none of the signals 91 and 92 occur at that point. However, upon one clockwise quarter turn, the legs 96 and 97 connect the line 103 to the supply 64 thereby providing the second signal 91, such as in the form of a fluid pressure acting on a piston 106 whose poppet valve 107 then closes off the fluid outlet passages 39 and 55 from the outlet 38. This presents thus an example of blocking the leveling valve 114 against discharge when the platform or other supported structure 12 has been lowered to a desired level. In the apparatus of FIG. 6, the first signal 90 is still active at that time as mentioned above.

No action is at that point provided by the valve 98, since the leg 99 is still closed off and not connected to any output line after one quarter turn of the core 98. However, after two quarter turns, the channel legs 99 and 100 connect the fluid line 104 to the supply 64 and provide thus the third signal 92.

Due to the line 109, the channel legs 96 and 97 still connect the line 103 to the supply 64 after the two clockwise quarter turns mentioned above in connection with core 98. The second signal 91 thus persists along with the first signal 90 occurring simultaneously with the newly provided third signal 92. In the example of FIG. 6, that third signal 92 is in the form of a fluid pressure which pushes a further leveling piston 110 to the left as seen in FIG. 6. This, in turn, causes a stem 112 of piston 110 to push a ball 113 from its seat 115 against the bias of a spring 116. In the absence of the third signal 92, that ball valve 113-116 closes off a fluid passage 118 connected to the fluid inlet 57. However, upon occurrence of the third signal, fluid from the reservoir 64 flows through the inlet port 57, passage 118, then open ball valve 113-116 and a channel 119 to the outlet port 54 and hence to the spring 21.

The fluid spring 21 may thus be inflated while the second signal 91 is still present and blocks the fluid from escaping at 107. The platform or other supported structure may thus be raised to a desired level, whereupon the second signal 92 is terminated by rotation of the core 98 along with core 95. As indicated by an arrow 120, the fluid line 104 may thus be exhausted so that the ball valve 113-116 reseats itself. The line 103 may also be exhausted. A spring 121 returns the poppet valve 107 to its open position, whereby the exhaust passages 39 and 55 are again connected to the fluid exhaust 38.

The first signal 90 is terminated, such as by return of the switch 40 to its initial position. This prevents the fluid spring 21 from dumping directly through fluid passages 55, 39 and outlet 38 in circumvention of the controlled valve passage 26. In this respect, FIG. 6 shows a further embodiment in which the leveling features disclosed above with the aid of FIGS. 1 to 5 may be provided in the same valve 114 which thus includes the above mentioned features of valve 14.

In that case, the valve 114 with valves 93, 94 and actuator 40 can be used to level a loadbed with respect to a stationary ramp or platform, for instance, while the part of the valve 114 that incorporates the valve 14 can subsequently be used for leveling that loadbed when moving with a load thereon. Fluid dumping can be effected with the actuator 40, such as in the manner described above. As seen in FIG. 6, the actuator 101 is independent of both the actuator 40 and the lever 80 (see FIGS. 1 and 2). Accordingly, the above mentioned blocking of fluid outlet 38 in response to the second operator-controlled signal 91 is effected independently of the lever 80 and independently of the actuator 40. Likewise, the above mentioned inflation of the fluid spring in response to the third operator-controlled signal 92 is also effected independently of the lever 80 and independently of the actuator 40.

While rotary controlled valves 93 and 94 have been shown in FIG. 6, push-button valves may be used instead. For instance, first and second plungers (not shown) may be used instead of cores 95 and 98 of valves 93 and 94. The first plunger could have two transverse apertures for connecting the fluid supply 64 to the line 103 for signal 91 and to the line going to the port 46 for signal 90, whereby the platform would be lowered when that first plunger is depressed against a return spring, until that first plunger is released. The second plunger could have three transverse apertures for connecting the fluid supply 64 to the line 104 for the third signal 92 and again to the line 103 for the second signal 91 and to the line going to the port 46 for the first signal 90, whereby the platform would be raised when that second plunger is depressed against a return spring, until that second plunger is released. The platform or other supported structure 12 can thus be jogged into the desired position.

The subject extensive disclosure will render apparent or suggest to those skilled in the art various modifications and variations within the spirit and scope of the subject invention and equivalents thereof.

We claim:

1. In apparatus for leveling a supported structure relative to a supporting structure with a fluid suspension system for a vehicle, said fluid suspension system located between said supporting structure and said supported structure, said suspension system being nonreactive to vibrations due to road irregularities up to a certain vibration amplitude, the improvement comprising in combination:

a valve having first and second valve parts coupled to said supported structure and to said supporting structure, respectively, said first and second valve parts being on opposite sides of a plane for detentless movement relative to each other along said plane in response to movements of said supporting structure and said supported structure relative to each other;

spaced first and second ports in one of said first and second valve parts connectable to a fluid supply and a fluid spring, respectively, of said suspension system;

the other of said first and second valve parts having a first aperture at said first port and a second aperture at said second port, and a fluid passage between said first and second ports;

a fluid outlet in said other valve part at said second port for a removal of fluid from said fluid spring;

there being in a neutral position of said valve a first physical separation along said plane between said first aperture and said first port, a second physical separation along said plane between said second aperture and said second port, and a third physical separation along said plane between said fluid outlet and said second port;

fluid-tight seals between said first aperture and said first port, between said second aperture and said second port, and between said fluid outlet and said second port for the extent of said first, second and third separations, with each of said first, second and third separations being made proportional to said vibration amplitude;

an extension along said plane of one of said seals for said first aperture by a distance in a direction away from said first port also proportional to said amplitude; and an extension along said plane of another of said seals for said second aperture by a distance in a direction away from said second port proportional to said amplitude.

2. Apparatus as in claim 1, including:

a blind third port in said one valve part spaced from said first port by a distance corresponding to a distance between said first and second apertures;

said blind third port including a seal.

3. Apparatus as in claim 1, including:

a further fluid outlet at said valve; and means for deflating said fluid spring through said further outlet in response to an operator-controlled signal.

4. Apparatus as in claim 3, including:

means for blocking said fluid supply against discharge through said ports in response to said signal.

5. In apparatus for leveling a supported structure relative to a supporting structure with a fluid suspension system between said supporting structure and said supported structure, said suspension system being nonreactive to vibrations up to a certain vibration amplitude, the improvement comprising in combination:

a valve having first and second valve parts coupled to said supported structure and to said supporting structure, respectively, said first and second valve parts being on opposite sides of a plane for movement relative to each other along said plane in response to movements of said supporting structure and said supported structure relative to each other;

spaced first and second ports in one of said first and second valve parts connectable to a fluid supply and a fluid spring, respectively, of said suspension system;

the other of said first and second valve parts having a first aperture at said first port and a second aperture at said second port, and a fluid passage between said first and second ports;

a fluid outlet in said other valve part at said second port for a removal of fluid from said fluid spring;

there being in a neutral position of said valve a first physical separation along said plane between said first aperture and said first port, a second physical separation along said plane between said second aperture and said second port, and a third physical separation along said plane between said fluid outlet and said second port;

fluid-tight seals between said first aperture and said first port, between said second aperture and said second port, and between said fluid outlet and said second port for the extent of said first, second and third separations, with each of said first, second and third separations being made proportional to said vibration amplitude;

an extension along said plane of one of said seals for said first aperture by a distance in a direction away from said first port also proportional to said amplitude;

an extension along said plane of another of said seals for said second aperture by a distance in a direction away from said second port proportional to said amplitude;

a further fluid outlet at said valve;

means for deflating said fluid spring through said further outlet in response to an operator-controlled signal;

an auxiliary fluid supply; and means for blocking said deflation of said fluid spring through said further outlet until a cessation of fluid pressure in said auxiliary fluid supply.

6. In apparatus for leveling a supported structure relative to a supporting structure with a fluid suspension system between said supporting structure and said supported structure, said suspension system being non-reactive to vibrations up to a certain vibration amplitude, the improvement comprising in combination:

a valve having first and second valve parts coupled to said supported structure and to said supporting structure, respectively, said first and second valve parts being on opposite sides of a plane for movement relative to each other along said plane in response to movements of said supporting structure and said supported structure relative to each other;

spaced first and second ports in one of said first and second valve parts connectable to a fluid supply and a fluid spring, respectively, of said suspension system;

the other of said first and second valve parts having a first aperture at said first port and a second aperture at said second port, and a fluid passage between said first and second ports;

a fluid outlet in said other valve part at said second port for a removal of fluid from said fluid spring;

there being in a neutral position of said valve a first physical separation along said plane between said first aperture and said first port, a second physical separation along said plane between said second aperture and said second port, and a third physical separation along said plane between said fluid outlet and said second port;

fluid-tight seals between said first aperture and said first port, between said second aperture and said second port, and between said fluid outlet and said second port for the extent of said first, second and third separations, with each of said first, second and third separations being made proportional to said vibration amplitude;

an extension along said plane of one of said seals for said first aperture by a distance in a direction away from said first port also proportional to said amplitude;

an extension along said plane of another of said seals for said second aperture by a distance in a direction away from said second port proportional to said amplitude;

a further fluid outlet in said one valve part at said second port;

an auxiliary valve blocking fluid discharge through said further outlet during operation of said suspension system; and an actuator for said auxiliary valve, whereby said fluid spring is deflatable through said further outlet upon a cessation of operation of said suspension system.

7. Apparatus as in claim 6, including:

a further auxiliary valve blocking said fluid supply against discharge through said ports during deflation of said fluid spring through said further outlet.

8. In apparatus for leveling a supported structure relative to a supporting structure with a fluid suspension system for a vehicle, having a fluid spring between said supporting structure and said supported structure, said suspension system being non-reactive to vibrations due to road irregularities up to a certain vibration amplitude, the improvement comprising in combination:

a valve having first and second valve parts coupled to said supported structure and to said supporting structure, respectively, said first and second valve parts being on opposite sides of a plane for detentless movement relative to each other along said plane in response to movements of said supporting structure and said supported structure relative to each other;

a port in one of said first and second valve parts connected to said fluid spring of said suspension system;

the other of said first and second valve parts including a fluid passage having an aperture at said port for a supply of fluid through said port to said fluid spring in a first relative position of said first and second valve parts;

a fluid outlet in said other valve part at said port, for a removal of fluid from said fluid spring through the same port through which fluid is supplied to said fluid spring;

there being in a neutral position of said valve a first physical separation along said plane between said aperture and said port, and a second physical separation along said plane between said fluid outlet and said port; and a fluid-tight seal between said aperture and said port, and between said fluid outlet and said port for the extent of said first and second separations, with each of said first and second separations being made proportional along said plane to an amplitude of said vibrations to be tolerated without reaction of said suspension system to vibrations within said amplitude; and an extension along said plane of said seal for said aperture by a distance in a direction away from said port also proportional to said amplitude.

9. Apparatus as in claim 8, wherein:

said aperture is smaller than said port.

10. Apparatus as in claim 8, including:

a further fluid outlet at said valve; and means for deflating said fluid spring through said further outlet in response to an operator-controlled signal.

11. Apparatus as in claim 10, including:

means for blocking said fluid supply against discharge through said port in response to said signal.

12. In apparatus for leveling a supported structure relative to a supporting structure with a fluid suspension system, having a fluid spring between said supporting structure and said supported structure, said suspension system being non-reactive to vibrations up to a certain vibration amplitude, the improvement comprising in combination:

- a valve having first and second valve parts coupled to said supported structure and to said supporting structure, respectively, said first and second valve parts being on opposite sides of a plane for movement relative to each other along said plane in response to movements of said supporting structure and said supported structure relative to each other;
- a port in one of said first and second valve parts connected to said fluid spring of said suspension system;
- the other of said first and second valve parts including a fluid passage having an aperture at said port for a supply of fluid through said port to said fluid spring in a first relative position of said first and second valve parts;
- a fluid outlet in said other valve part at said port, for a removal of fluid from said fluid spring through the same port through which fluid is supplied to said fluid spring;
- there being in a neutral position of said valve a first physical separation along said plane between said aperture and said port, and a second physical separation along said plane between said fluid outlet and said port;
- a fluid-tight seal between said aperture and said port, and between said fluid outlet and said port for the extent of said first and second separations, with each of said first and second separations being made proportional along said plane to an amplitude of said vibrations to be tolerated without reaction of said suspension system to vibrations within said amplitude;
- an extension along said plane of said seal for said aperture by a distance in a direction away from said port also proportional to said amplitude;
- a further fluid outlet at said valve;
- means for deflating said fluid spring through said further outlet in response to an operator-controlled signal;
- an auxiliary fluid supply; and
- means for blocking said deflation of said fluid spring through said further outlet until a cessation of fluid pressure in said auxiliary fluid supply.

13. In apparatus for leveling a supported structure relative to a supporting structure with a fluid suspension system, having a fluid spring between said supporting structure and said supported structure, said suspension system being non-reactive to vibrations up to a certain vibration amplitude, the improvement comprising in combination:

- a valve having first and second valve parts coupled to said supported structure and to said supporting structure, respectively, said first and second valve parts being on opposite sides of a plane for movement relative to each other along said plane in response to movements of said supporting structure and said supported structure relative to each other;
- a port in one of said first and second valve parts connected to said fluid spring of said suspension system;
- the other of said first and second valve parts including a fluid passage having an aperture at said port for a supply of fluid through said port to said fluid spring in a first relative position of said first and second valve parts;
- a fluid outlet in said other valve part at said port, for a removal of fluid from said fluid spring through the same port through which fluid is supplied to said fluid spring;
- there being in a neutral position of said valve a first physical separation along said plane between said aperture and said port, and a second physical separation along said plane between said fluid outlet and said port;
- a fluid-tight seal between said aperture and said port, and between said fluid outlet and said port for the extent of said first and second separations, with each of said first and second separations being made proportional along said plane to an amplitude of said vibrations to be tolerated without reaction of said suspension system to vibrations within said amplitude;
- an extension along said plane of said seal for said aperture by a distance in a direction away from said port also proportional to said amplitude;
- a further fluid outlet in said one valve part at said port;
- an auxiliary valve blocking fluid discharge through said further outlet during operation of said suspension system; and
- an actuator for said auxiliary valve, whereby said fluid spring is deflateable through said further outlet upon a cessation of operation of said suspension system.

14. Apparatus as in claim 13, including:
- a further auxiliary valve blocking said fluid supply against discharge through said port during deflation of said fluid spring through said further outlet.

15. In apparatus for leveling a supported structure relative to a supporting structure with a fluid suspension system, having a fluid spring and having a leveling valve having first and second valve parts movable relative to each other, and an actuating lever for angularly moving one of said first and second valve parts relative to the other of said first and second valve parts, said leveling valve and lever connected between said supporting structure and said supported structure, and including a fluid supply connected through said leveling valve to said fluid spring, the improvement comprising in combination:

- a fluid outlet;
- means independent of said actuating lever for deflating said fluid spring through said fluid outlet in response to an operator-controlled signal; and
- means independent of said actuating lever and independent of said one of said first and second valve parts for blocking said fluid supply against discharge in response to said signal.

16. Apparatus as in claim 15, including:
an auxiliary fluid supply; and
means for blocking complete deflation of said fluid spring through said fluid outlet until a cessation of fluid pressure in said auxiliary fluid supply.

17. Apparatus as in claim 15, including:
an auxiliary valve blocking fluid discharge through said fluid outlet during operation of said suspension system;
an actuator for said auxiliary valve, whereby said fluid spring is deflated through said fluid outlet upon a cessation of operation of said suspension system; and a further auxiliary valve blocking said fluid supply against discharge through said fluid outlet during deflation of said fluid spring through said fluid outlet.

18. Apparatus as in claim 15, wherein:
said fluid outlet and at least part of said means for deflating said fluid spring in response to an operator-controlled signal and said means for blocking said fluid supply are in said leveling valve independent of said one of said first and second valve parts.

19. In apparatus for leveling a supported structure relative to a supporting structure with a fluid suspension system, having a fluid spring between said supporting structure and said supported structure and having a leveling valve for said fluid spring, the improvement comprising in combination:
a leveling valve actuator lever connected to said leveling valve;
a valve port in said leveling valve connectable to said fluid spring of said suspension system for selective inflation and deflation of the fluid spring;
a fluid outlet in said leveling valve;
an actuator issuing a first operator-controlled signal, said actuator being independent of said leveling valve;
means connected to said actuator and independent of said actuator lever for deflating the fluid spring through said valve port and said fluid outlet in response to said first operator-controlled signal;
means independent of said actuator and independent of said actuator lever for blocking said fluid outlet in said leveling valve against discharge in response to a second operator-controlled signal; and
means independent of said actuator for selectively inflating said fluid spring through said valve port from a fluid supply in response to a third operator-controlled signal independent of said actuator lever while blocking said fluid outlet in said leveling valve.

20. Apparatus as in claim 19, including:
an auxiliary fluid supply; and
means for blocking said deflation of said fluid spring through said fluid outlet until a cessation of fluid pressure in said auxiliary fluid supply.

21. Apparatus as in claim 19, including:
means for blocking said fluid supply against discharge through said valve port during deflation of said fluid spring through said fluid outlet.

22. Apparatus as in claim 19, wherein:
said leveling valve has first and second valve parts coupled to said supported structure and to said supporting structure, respectively, said first and second valve parts being on opposite sides of a plane and being movable relative to each other along said plane in response to movements of said supporting structure and said supported structure relative to each other;
said valve port being in one of said first and second valve parts;
the other of said first and second valve parts including a fluid passage having an aperture at said port for a supply of fluid through said port to said fluid spring in a first relative position of said first and second valve parts;
a fluid outlet passage in said other valve part spaced from said port in said first relative position of said first and second valve parts, and communicating with said port for a removal of fluid from said fluid spring in a second relative position of said first and second valve parts through the same port through which fluid is supplied to said fluid spring; and
a first physical separation along said plane between said aperture and said port, and a second physical separation along said plane between said fluid outlet and said port in a neutral position of said valve between said first and second relative positions.

23. Apparatus as in claim 22, including:
a fluid-tight seal between said aperture and said port, and between said fluid outlet and said port for the extent of said first and second separations, each of said first and second separations being proportional along said plane to an amplitude of said vibrations to be tolerated without reaction of said suspension system to vibrations within said amplitude; and
an extension of said seal for said aperture along said plane by a distance in a direction away from said port also proportional to said amplitude.

24. In a method of leveling a supported structure relative to a supporting structure with a fluid suspension system for a vehicle, said fluid suspension system located between said supporting structure and said supported structure, the improvement comprising in combination the steps of:
providing a valve having first and second valve parts coupled to said supported structure and to said supporting structure, respectively, said first and second valve parts being on opposite sides of a plane and being movable relative to each other along said plane in response to movements of said supporting structure and said supported structure relative to each other;
providing one of said first and second valve parts with spaced first and second ports connected to a fluid supply and a fluid spring, respectively, of said suspension system;
providing the other of said first and second valve parts with a first aperture at said first port and a second aperture at said second port, and interconnecting said first and second apertures internally of said other valve part for passage of fluid between said first and second ports in a first relative position of said first and second valve parts;
providing a fluid outlet in said other valve part spaced from said second port in said first relative position of said first and second valve parts, and communicating with said second port for a removal of fluid from said fluid spring in a second relative position of said first and second valve parts;
providing said valve in a neutral position between said first and second relative positions with a first physical separation along said plane between said first aperture and said first port, with a second physical separation along said plane between said second aperture and said second port, and with a third physical separation along said plane between said fluid outlet and said second port;
said first and second valve parts being detentlessly movable among said neutral position and said first and second positions in response to movements of said supporting structure and said supported structure relative to each other; and
reducing reaction of said suspension system to vibrations due to road irregularities by providing fluid-tight seals between said first aperture and said first port, between said second aperture and said second port, and between said fluid outlet and said second port for the extent of said first, second and third separations, with each of said first, second and third separations being made proportional along said plane to an amplitude of said vibrations due to road irregularities to be tolerated without reaction of said suspension system to vibrations within said amplitude, and by extending one of said seals for said first aperture by a distance along said plane in a direction away from said first port also proportional to said amplitude and by also extending another of said seals for said second aperture by a distance along said plane in a direction away from said second port proportional to said amplitude.

25. A method as in claim 24, including the steps of:
providing in said one valve part a blind third port;
moving said first aperture to said blind third port upon movement of said second aperture to said first port by movement of said other valve part further away from said first relative position than an initial range of said second relative position of said first and second valve parts; and
sealing off said blind third port.

26. A method as in claim 24, including the steps of:
providing a further fluid outlet at said valve; and
deflating said fluid spring through said further outlet in response to an operator-controlled signal.

27. A method as in claim 26, including the step of:
blocking said fluid supply against discharge through said ports in response to said signal.

28. In a method of leveling a supported structure relative to a supporting structure with a fluid suspension system between said supporting structure and said supported structure, the improvement comprising in combination the steps of:
providing a valve having first and second valve parts coupled to said supported structure and to said supporting structure, respectively, said first and second valve parts being on opposite sides of a plane and being movable relative to each other along said plane in response to movements of said supporting structure and said supported structure relative to each other;
providing one of said first and second valve parts with spaced first and second ports connected to a fluid supply and a fluid spring, respectively, of said suspension system;
providing the other of said first and second valve parts with a first aperture at said first port and a second aperture at said second port, and interconnecting said first and second apertures internally of said other valve part for passage of fluid between said first and second ports in a first relative position of said first and second valve parts;
providing a fluid outlet in said other valve part spaced from said second port in said first relative position of said first and second valve parts, and communicating with said second port for a removal of fluid from said fluid spring in a second relative position of said first and second valve parts;
providing said valve in a neutral position between said first and second relative positions with a first physical separation along said plane between said first aperture and said first port, with a second physical separation along said plane between second aperture and said second port, and with a third physical separation along said plane between said fluid outlet and said second port;
reducing reaction of said suspension system to vibrations by providing fluid-tight seals between said first aperture and said first port, between said second aperture and said second port, and between said fluid outlet and said second port for the extent of said first, second and third separations, with each of said first, second and third separations being made proportional along said plane to an amplitude of said vibrations to be tolerated without reaction of said suspension system to vibrations within said amplitude, and by extending one of said seals for said first aperture by a distance along said plane in a direction away from said first port also proportional to said amplitude and by also extending another of said seals for said second aperture by a distance along said plane in a direction away from said second port proportional to said amplitude;
providing a further fluid outlet at said valve;
deflating said fluid spring through said further outlet in response to an operator-controlled signal;
providing an auxiliary fluid supply; and
blocking said deflation of said fluid spring through said further outlet until a cessation of fluid pressure in said auxiliary fluid supply.

29. In a method of leveling a supported structure relative to a supporting structure with a fluid suspension system between said supporting structure and said supported structure, the improvement comprising in combination the steps of:
providing a valve having first and second valve parts coupled to said supported structure and to said supporting structure, respectively, said first and second valve parts being on opposite sides of a plane and being movable relative to each other along said plane in response to movements of said supporting structure and said supported structure relative to each other;
providing one of said first and second valve parts with spaced first and second ports connected to a fluid supply and a fluid spring, respectively, of said suspension system;
providing the other of said first and second valve parts with a first aperture at said first port and a second aperture at said second port, and interconnecting said first and second apertures internally of said other valve part for passage of fluid between said first and second ports in a first relative position of said first and second valve parts;
providing a fluid outlet in said other valve part spaced from said second port in said first relative position of said first and second valve parts, and communicating with said second port for a removal of fluid from said fluid spring in a second relative position of said first and second valve parts;
providing said valve in a neutral position between said first and second relative positions with a first physical separation along said plane between said first aperture and said first port, with a second physical separation along said plane between said second aperture and said second port, and with a third physical separation along said plane between said fluid outlet and said second port;
reducing reaction of said suspension system to vibrations by providing fluid-tight seals between said first aperture and said first port, between said second aperture and said second port, and between said fluid outlet and said second port for the extent of said first, second and third separations, with each of said first, second and third separations being made proportional along said plane to an amplitude of said vibrations to be tolerated without reaction of said suspension system to vibrations within said amplitude, and by extending one of said seals for said first aperture by a distance along said plane in a direction away from said first port also proportional to said amplitude and by also extending another of said seals for said second aperture by a distance along said plane in a direction away from said second port proportional to said amplitude;

providing in said one valve part a further fluid outlet at said second port;

blocking fluid discharge through said further outlet during operation of said suspension system; and deflating said fluid spring through said further outlet upon a cessation of operation of said suspension system.

30. A method as in claim 29, including the step of:
blocking said fluid supply against discharge through said ports during deflation of said fluid spring through said further outlet.

31. In a method of leveling a supported structure relative to a supporting structure with a fluid suspension system for a vehicle, having a fluid spring between said supporting structure and said supported structure, the improvement comprising in combination the steps of:
providing a valve having first and second valve parts coupled to said supported structure and to said supporting structure, respectively, said first and second valve parts being on opposite sides of a plane and being movable relative to each other along said plane in response to movements of said supporting structure and said supported structure relative to each other;
providing one of said first and second valve parts with a port connected to said fluid spring of said suspension system;
providing the other of said first and second valve parts with a fluid passage having an aperture at said port for a supply of fluid through said port to said fluid spring in a first relative position of said first and second valve parts;
providing a fluid outlet in said other valve part spaced from said port in said first relative position of said first and second valve parts, and communicating with said port for a removal of fluid from said fluid spring in a second relative position of said first and second valve parts through the same port through which fluid is supplied to said fluid spring;
providing said valve in a neutral position between said first and second relative positions with a first physical separation along said plane between said aperture and said port, with a second physical separation along said plane between said fluid outlet and said port;
said first and second valve parts being detentlessly movable among said neutral position and said first and second positions in response to movements of said supporting structure and said supported structure relative to each other; and
reducing reaction of said suspension system to vibrations due to road irregularities by providing a fluid-tight seals between said aperture and said port, and between said fluid outlet and said port for the extent of said first and second separations being made proportional along said plane to an amplitude of said vibrations due to road irregularities to be tolerated without reaction of said suspension system to vibrations within said amplitude, and by extending said seal for said aperture by a distance in a direction away from said port along said plane also proportional to said amplitude.

32. A method as in claim 31, including the step of:
making said aperture smaller than said port.

33. A method as in claim 31, including the steps of:
providing a further fluid outlet at said valve; and
deflating said fluid spring through said further outlet in response to an operator-controlled signal.

34. A method as in claim 33, including the step of:
blocking said fluid supply against discharge through said port in response to said signal.

35. In a method of leveling a supported structure relative to a supporting structure with a fluid suspension system, having a fluid spring between said supporting structure and said supported structure, the improvement comprising in combination the steps of:
providing a valve having first and second valve parts coupled to said supported structure and to said supporting structure, respectively, said first and second valve parts being on opposite sides of a plane and being movable relative to each other along said plane in response to movements of said supporting structure and said supported structure relative to each other;
providing one of said first and second valve parts with a port connected to said fluid spring of said suspension system;
providing the other of said first and second valve parts with a fluid passage having an aperture at said port for a supply of fluid through said port to said fluid spring in a first relative position of said first and second valve parts;
providing a fluid outlet in said other valve part spaced from said port in said first relative position of said first and second valve parts, and communicating with said port for a removal of fluid from said fluid spring in a second relative position of said first and second valve parts through the same port through which fluid is supplied to said fluid spring;
providing said valve in a neutral position between said first and second relative positions with a first physical separation along said plane between said aperture and said port, and with a second physical separation along said plane between said fluid outlet and said port;
reducing reaction of said suspension system to vibrations by providing a fluid-tight seal between said aperture and said port, and between said fluid outlet and said port for the extent of said first and second separations, with each of said first and second separations being made proportional along said plane to an amplitude of said vibrations to be tolerated without reaction of said suspension system to vibrations within said amplitude, and by extending said seal for said aperture by a distance in a direction away from said port along said plane also proportional to said amplitude;
providing a further fluid outlet at said valve;
deflating said fluid spring through said further outlet in response to an operator-controlled signal;
providing an auxiliary fluid supply; and blocking said deflation of said fluid spring through said further outlet until a cessation of fluid pressure in said auxiliary fluid supply.

36. In a method of leveling a supported structure relative to a supporting structure with a fluid suspension system, having a fluid spring between said supporting structure and said supported structure, the improvement comprising in combination the steps of:

providing a valve having first and second valve parts coupled to said supported structure and to said supporting structure, respectively, said first and second valve parts being on opposite sides of a plane and being movable relative to each other along said plane in response to movements of said supporting structure and said supported structure relative to each other;

providing one of said first and second valve parts with a port connected to said fluid spring of said suspension system;

providing the other of said first and second valve parts with a fluid passage having an aperture at said port for a supply of fluid through said port to said fluid spring in a first relative position of said first and second valve parts;

providing a fluid outlet in said other valve part spaced from said port in said first relative position of said first and second valve parts, and communicating with said port for a removal of fluid from said fluid spring in a second relative position of said first and second valve parts through the same port through which fluid is supplied to said fluid spring;

providing said valve in a neutral position between said first and second relative positions with a first physical separation along said plane between said aperture and said port, and with a second physical separation along said plane between said fluid outlet and said port;

reducing reaction of said suspension system to vibrations by providing a fluid-tight seal between said aperture and said port, and between said fluid outlet and said port for the extent of said first and second separations, with each of said first and second separations being made proportional along said plane to an amplitude of said vibrations to be tolerated without reaction of said suspension system to vibrations within said amplitude, and by extending said seal for said aperture by a distance in a direction away from said port along said plane also proportional to said amplitude;

providing in said one valve part a further fluid outlet at said port;

blocking fluid discharge through said further outlet during operation of said suspension system; and deflating said fluid spring through said further outlet upon a cessation of operation of said suspension system.

37. A method as in claim 36, including the step of:
blocking said fluid supply against discharge through said port during deflation of said fluid spring through said further outlet.

38. In a method of leveling a supported structure relative to a supporting structure with a fluid suspension system, having a fluid supply, a fluid spring, and a leveling valve having first and second valve parts movable relative to each other, and an actuating lever for angularly moving one of said first and second valve parts relative to the other of said first and second valve parts, said leveling valve and lever connected between said supporting structure and said supported structure, the improvement comprising in combination the steps of:

providing said leveling valve in said first valve part with a valve port connected to said fluid spring of said suspension system for selective inflation of the fluid spring from said fluid supply and for selective deflation of said fluid spring;

providing a fluid outlet;

deflating the fluid spring through said fluid outlet in response to an operator-controlled signal independently of said actuating lever; and blocking said fluid supply against discharge through said port in response to said signal independently of said actuating lever and independently of said one of said first and second valve parts.

39. A method as in claim 38, including the steps of:
providing an auxiliary fluid supply; and
blocking said deflation of said fluid spring through said fluid outlet until a cessation of fluid pressure in said auxiliary fluid supply;
said blocking being independent of said one of said first and second valve parts.

40. A method as in claim 38, wherein:
said blocking includes blocking said fluid supply against discharge through said port during deflation of said fluid spring through said fluid outlet;
said blocking being independent of said one of said first and second valve parts.

41. A method as in claim 38, wherein:
said fluid outlet is provided in said leveling valve; and
said blocking of said fluid supply against discharge is effected in said leveling valve;
said blocking being independent of said one of said first and second valve parts.

42. In a method of leveling a supported structure relative to a supporting structure with a fluid suspension system, having a fluid spring between said supporting structure and said supported structure and having a leveling valve for said fluid spring, the improvement comprising in combination the steps of:

providing said leveling valve with a lever for actuating said leveling valve;

connecting said lever to one of said supporting structure and said supported structure;

providing said leveling valve with a valve port connected to said fluid spring of said suspension system for selective inflation and deflation of the fluid spring;

providing said leveling valve with a fluid outlet;

providing an actuator for issuing a first operator-controlled signal, said actuator being independent of said leveling valve;

deflating the fluid spring through said valve port and said fluid outlet in response to said first operator-controlled signal independently of said lever;

blocking said fluid outlet in said leveling valve against discharge in response to a second operator-controlled signal independently of said lever and independently of said actuator; and selectively inflating said fluid spring through said valve port from a fluid supply in response to a third operator-controlled signal independently of said lever and independently of said actuator while blocking said fluid outlet in said leveling valve.

43. A method as in claim 42, including the steps of:
providing an auxiliary fluid supply; and blocking said deflation of said fluid spring through said fluid outlet until a cessation of fluid pressure in said auxiliary fluid supply.

44. A method as in claim 42, wherein:

said fluid supply is blocked against discharge through said valve port during deflation of said fluid spring through said fluid outlet.

45. A method as in claim 42, including the steps of:

providing said leveling valve with first and second valve parts coupled to said supporting structure, respectively, said first and second valve parts being on opposite sides of a plane and being movable relative to each other along said plane in response to movements of said supporting structure and said supported structure relative to each other;

providing said valve port in one of said first and second valve parts;

providing the other of said first and second valve parts with a fluid passage having an aperture at said port for a supply of fluid through said port to said fluid spring in a first relative position of said first and second valve parts;

providing a fluid outlet passage in said other valve part spaced from said port in said first relative position of said first and second valve parts, and communicating with said port for a removal of fluid from said fluid spring in a second relative position of said first and second valve parts through the same port through which fluid is supplied to said fluid spring; and providing said valve in a neutral position between said first and second relative positions with a first physical separation along said plane between said aperture and said port, and with a second physical separation along said plane between said fluid outlet and said port.

46. A method as in claim 45, including the steps of:

reducing reaction of said suspension system to vibrations by providing a fluid-tight seal between said aperture and said port, and between said fluid outlet and said port for the extent of said first and second separations, with each of said first and second separations being made proportional along said plane to an amplitude of said vibrations to be tolerated without reaction of said suspension system to vibrations within said amplitude, and by extending said seal for said aperture along said plane by a distance in a direction away from said port also proportional to said amplitude.

* * * * *

UNITED STATES PATENT AND TRADEMARK OFFICE
CERTIFICATE OF CORRECTION

PATENT NO. : 5,161,817
DATED : November 10, 1992
INVENTOR(S) : James W. Daum et al It is certified that error appears in the above-identified patent and that said Letters Patent is hereby corrected as shown below:

Column 1, line 53, after "several" insert --patents by N. B. Christensen. In particular, his--;
Column 3, line 29, after "including" insert a comma (,);
Column 5, line 47, after the comma (,) insert --means connected to the actuator and independent of the actuator lever for deflating the fluid spring through the valve port, and the fluid outlet in response to the first operator-controlled signal, means connected to the actuator and independent of the actuator lever for blocking the fluid outlet in the--;
Column 5, line 48, after "operator-controlled" insert --signal, and means independent of the actuator for selectively--;
Column 7, line 54, after "are" insert --on--;
Column 10, line 11, cancel "3-" and insert --3-3--;
Column 10, line 16, cancel "3-" and insert --3-3--;
Column 20, claim 6, line 7, change "deflatable" to --deflateable--;
Column 27, claim 31, line 57, after the comma (,) insert --and--;
Column 27, claim 31, line 67, change "seals" to --seal--;
Column 28, claim 31, line 1, after "separations" insert --, with each of said first and second separations--; and

UNITED STATES PATENT AND TRADEMARK OFFICE
CERTIFICATE OF CORRECTION

PATENT NO. : 5,161,817
DATED : November 10, 1992
INVENTOR(S) : James W. Daum, et. al.

It is certified that error appears in the above-identified patent and that said Letters Patent is hereby corrected as shown below:

Column 31, claim 45, line 10, change "supporting" to --supported--, and after "structure" insert --and to said supporting structure--.

Signed and Sealed this

Ninth Day of November, 1993

Attest:

BRUCE LEHMAN

Attesting Officer

Commissioner of Patents and Trademarks